United States Patent [19]
Ulke

[11] 3,983,427
[45] Sept. 28, 1976

[54] SUPERCONDUCTING WINDING WITH GROOVED SPACING ELEMENTS

[75] Inventor: Asim Ulke, Monroeville, Pa.

[73] Assignee: Westinghouse Electric Corporation, Pittsburgh, Pa.

[22] Filed: May 14, 1975

[21] Appl. No.: 577,517

[52] U.S. Cl. .............................. 310/61; 310/40 R; 310/261
[51] Int. Cl.² ........................................ H02K 1/32
[58] Field of Search .............. 310/52, 264, 65, 265, 310/40, 267, 10, 214, 215, 217, 218, 198, 195, 208, 261; 336/60; 335/216

[56] References Cited
UNITED STATES PATENTS

| | | | |
|---|---|---|---|
| 1,793,434 | 2/1931 | Blathy | 310/65 |
| 2,956,186 | 10/1960 | Wall | 310/65 |
| 3,195,084 | 7/1965 | Book | 310/65 |
| 3,416,111 | 12/1968 | Bogner | 336/60 |
| 3,444,307 | 5/1969 | Kafka | 174/27 |
| 3,514,730 | 5/1970 | Kassner | 336/60 |
| 3,596,120 | 7/1971 | Potter | 310/65 |
| 3,602,857 | 8/1971 | Robin | 336/60 |

Primary Examiner—R. Skudy
Attorney, Agent, or Firm—G. H. Telfer

[57] ABSTRACT

A spacing element is disposed between adjacent conductor layers of a coil to permit passage of a cooling fluid therethrough. The spacing element comprises rib portions which engage and space apart confronting surfaces of conductor turns of next adjacent layers and non-contacting portions which in combination with the confronting surfaces of the conductors define a plurality of channels to permit passage of the cooling fluid through the coil. Each channel has an inlet port to receive the cooling fluid and an outlet port to discharge the cooling fluid after it has passed through the coil.

12 Claims, 5 Drawing Figures

SUPERCONDUCTING WINDING WITH GROOVED SPACING ELEMENTS

BACKGROUND OF THE INVENTION

1. Field of the Invention

This invention relates generally to a winding structure for a dynamoelectric machine core, and more specifically, this invention relates to the structure of a superconductive winding with cooling passages formed therein.

2. Description of the Prior Art

It is known that when certain materials, referred to as superconductors, are cooled to near absolute zero they exhibit a complete loss of electrical resistance. Practical utilization of the zero resistance character of superconductive materials has been applied to great advantage in dynamoelectric machinery. For example, in a synchronous generator the use of a superconductive direct current field winding allows a considerable increase in the field magnetomotive force generated by the winding and greatly increased flux densities in the active air gap of the machine. This increase in flux density provides considerably increased power density and substantial reductions in the weight and volume of the machine. Thus, higher ratings for turbine generators can be obtained without prohibitive increases in frame size.

Superconductors which are suitable for such high current density, high field applications are subject to instabilities where a small disturbance in operating conditions can cause a quench. In particular, the superconductive effect will be quenched or lost unless the superconductors are maintained at very low temperatures. Therefore, it is imperative that adequate cooling arrangements be provided. Thus, when a winding or coil is formed of superconductive wires, provision must be made for bringing a coolant or refrigerant into intimate contact with the superconductors.

Prior art cooling arrangements for superconductive windings generally include loosely bundled windings or tightly bundled windings having flow separators of various types. The simplest of such conventional winding structures is a winding potted solidly in an insulating material. Internal heat generation is removed by conduction to a cooling source external of the winding. Strips of material with high thermal conductivity may be potted into the winding to improve the conduction heat transfer. This type of construction inherently resists conductor motion, which is a potential source of substantial losses. The helium coolant may be confined to small radii to minimize the temperature rise due to rotational compression. The major drawback of this construction is that the maximum internal heat generation rate and maximum winding thickness are inherently limited. This limits the rate at which the winding may be charged and discharged and the severity of transients which can be tolerated.

An alternate cooling arrangement involves pool boiling. By making the winding porous and immersing it in a bath of liquid coolant, the maximum internal heat generation rates can be substantially higher than those in a conduction cooled winding as described above. This allows fast recharging and discharging of the winding and increases the tolerance of the winding to other transients. However, it is more difficult to construct a porous winding with sufficient rigidity to resist conductor motion. In a rotating machine the coolant is not confined to small radii and rotational compression effects are not insignificant.

It is obvious that the design of a practical superconducting winding involves a compromise between conflicting requirements. In the cooling design of a superconducting winding the following criteria must be considered:

a. the temperature difference between the maximum conductor temperature at any part of the winding and the coolant must be minimized;

b. the internal space required by the cooling system must be minimized;

c. coolant mass present inside the winding structure at any time must be minimized for reasons of safety;

d. the coolant flow rate must be minimized for economy;

e. the cooling structure must be reliable and operate without need for internal maintenance;

f. the cooling system must be easy to manufacture and install; and g. the cooling system and the winding must withstand the large rotational and magnetic forces involved without any mechanical movement or vibration.

As discussed above, various cooling systems have been proposed or are being used, including porous separators, conductors with internal or external cooling passages, magnets with an annulus either at the outer radius or at the inner radius of the magnet for a cooling passage, and loosely bundled windings with random cooling passages between the conductors. These existing systems generally fail to meet one or more of the above criteria completely or in part. Examples of such prior art winding arrangements may be seen in: U.S. Pat. Nos. 3,559,126 issued to Drautman, Jr.; Pat. 3,501,727 issued to Kafka; Pat. 3,444,307 issued to Kafka; Pat. 3,416,111 issued to Bogner; and U.S. Pat. 3,363,207 issued to Brechna.

SUMMARY OF THE INVENTION

The present invention came about in connection with an alternative superconductive winding cooling arrangement which utilizes forced convection of a cooling fluid in which maximum winding heat generation rates are achieved by forcing a liquid coolant through the winding by applying an external pressure differential. In such a cooling arrangement the heat transfer between the winding surface and the liquid coolant will be higher than in the pool boiling technique discussed above. The vapor bubbles generated in the winding are driven out, avoiding the formation of vapor pockets, which can occur in a natural convection cooled winding.

The design of such a forced cooled winding is more complex than a natural convection cooled winding. Flow passages must be provided which force the liquid coolant to flow through all parts of the winding. Leakage between flow passages must be minimized. Some means of creating the external pressure difference must be present. In a rotating winding however, the natural pumping action of the winding may be used to provide sufficient pressurization.

Accordingly, the winding structure of the present invention involves cooling the winding by forcing a liquid coolant through the winding by means of separators with grooves for the coolant passages. The separator comprises a spacing element which is disposed between adjacent conductor layers and extends through the winding in convolute relation with the winding layers. The spacing element comprises rib portions which engage and space apart confronting surfaces of the conductor turns of next adjacent conductor layers and also non-contacting portions which in combination with the confronting surfaces of the conductors define a plurality of channels to permit passage of the cooling fluid through the coil. Each channel has an inlet port to receive the cooling fluid and an outlet port to discharge the cooling fluid after it has passed through the coil.

The thickness of the spacing element may be quite small as compared to the thickness of the adjacent conductors so that an excellent ratio of superconductor per unit winding may be achieved.

In a winding structure for a dynamoelectric machine core which has slots in which a number of conductor turns are convolutely wound to form a plurality of coils, and each of the coils having a plurality of conductor layers, a particularly useful arrangement of the spacing elements is one in which there are two winding layers disposed intermediate of each pair of spacing elements. In this arrangement the rib portions of each spacing element are interposed immediate of adjacent channels to provide at least one discrete cooling channel for each next adjacent conductor. In this manner at least one side of each conductor in the winding is intimately exposed to the liquid coolant as it flows through the winding. To maximize the surface area of each conductor which is intimately exposed to the cooling fluid, each channel preferably has a lateral extent in cross section which is small in relation to its transverse extent so that the surface area of the conductor which in combination defines the channel is large in relation to the surface area contacted by the rib portions.

Since the spacing element is intended to provide a flow passage for the cooling fluid, it may be either metallic or non-metallic. In a preferred embodiment of the invention, the spacing element is formed from a thin copper sheet in which channels are extruded to provide a plurality of channel openings, each of which having a size and pitch which is determined by the cooling requirements of the winding. The coolant entry and discharge from the winding is provided by means of manifolds which are coupled with the inlet ports and outlet ports of the channels.

Under this arrangement, the spacing elements appear as thin sheets which are wrapped or wound in a convolute arrangement between adjacent conductor layers of the winding and thus are adequately supported against the large rotational and magnetic forces which are involved in such a winding without any mechanical movement or vibration.

The foregoing and other objects, advantages and features of this invention will hereinafter appear, and for purposes of illustration, but not of limitation, and exemplary embodiment of the invention is shown in the appended drawing.

DESCRIPTION OF THE PREFERRED EMBODIMENT

Figure 1:
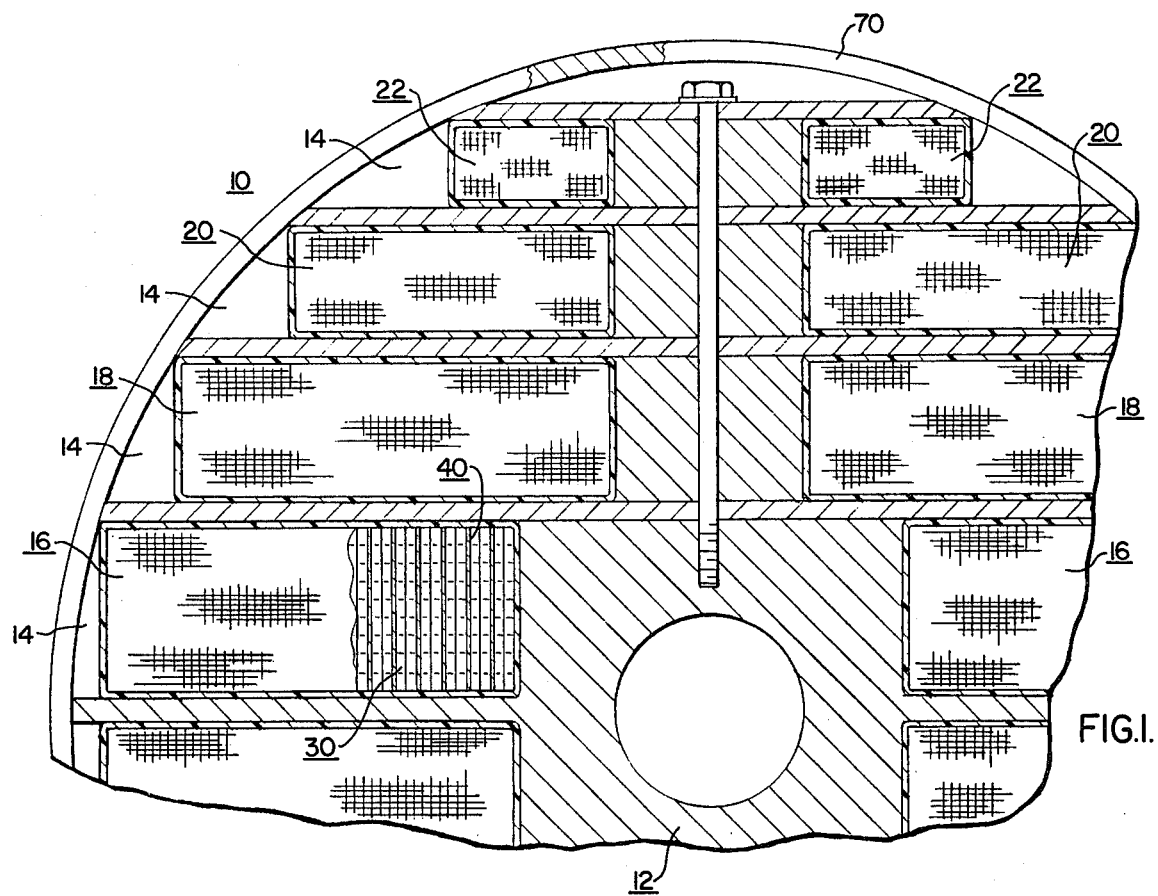
FIG. 1 is an elevational view of a superconducting rotor structure, partly in section, in which the invention is incorporated.

Throughout the description which follows, like reference characters refer to like elements in all figures of the drawing.

In FIG. 1 of the drawing a rotor assembly 10 having a winding constructed according to the teachings of the present invention is illustrated. The rotor 10 comprises a core member 12 which includes a plurality of slots 14 within which a number of conductor turns 30 are convolutely wound to form a plurality of coils 16, 18, 20, and 22. The rotor core member 12 is preferably constructed from a non-ferromagnetic material which has high mechanical strength and good ductility at cryogenic temperatures, such as austenitic stainless steel, although other non-ferromagnetic materials may be used to good advantage. By "non-ferromagnetic material" it is meant a substance whose relative permeability is approximately 1. While the description of this preferred embodiment is made with respect to a winding utilizing superconductive wire, the invention is equally applicable to the windings utilizing conventional conductors.

As in conventional generator design, the core member 12 is adapted for mechanical connection to a shaft for rotational movement by a prime mover (not shown). Also, the winding comprising the coils 16, 18, 20, and 22 is adapted for connection to a DC source (not shown) for excitation of the generator. In the winding configuration of FIG. 1, one pole of a two-pole winding is illustrated. Of course, the winding from pursuant to this invention may comprise a plurality of pole pairs and may be utilized in any suitable electromagnetic device. It may also be disposed in chambers other than a winding slot of dynamoelectric machine. The wire utilized in the winding need not be superconductive, although the invention has particular applicability to superconductive winding structures such as the specific embodiment illustrated and discussed herein.

Figure 2:
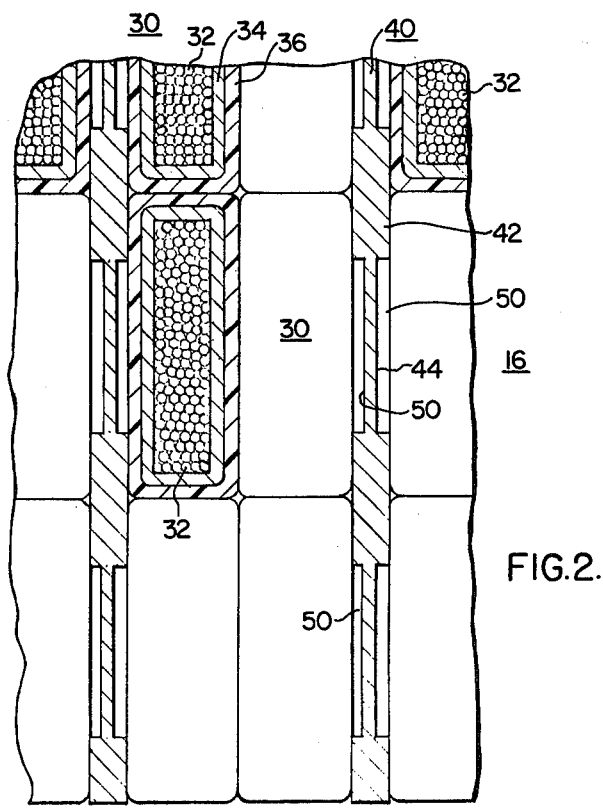
FIG. 2 is an enlarged cross-sectional view of a portion of the winding of the rotor structure illustrated in FIG. 1.

The superconductive wires 30 utilized in this preferred embodiment are relatively conventional superconductive wires, which may be seen in greater detail in the enlarged view of FIG. 2. The wires 30 have a multiplicity of filaments 32 formed of a suitable superconductive material. An example of such a superconductive material is niobium-titanium. The filaments 32 are formed into a strand which is encased by a sheath 34 of normally conductive material, such as copper. At cryogenic temperatures when the resistance of the filaments 32 vanish, the sheath 34 appears as a non-conductor or insulator with respect to the superconductors. Each of the sheaths 34 of normally conductive material is surrounded by layer of insulation 36. The insulation 36 may be of any suitable insulating material, although the material found most suitable in this application is phenolic modified polyvinyl formal.

As can be seen in FIGS. 1 and 2, the preferred embodiment shown herein utilizes superconductive wires having a rectangular cross-section. The advantages of the rectangular shape is that such wires are easy to produce, and as a result of symmetry, are easy to wind in the slots 14. Each of the coils 16–22 comprises a number of turns of the superconductive wires 30 which are convolutely wound to form a plurality of layers within each slot.

Figure 4:
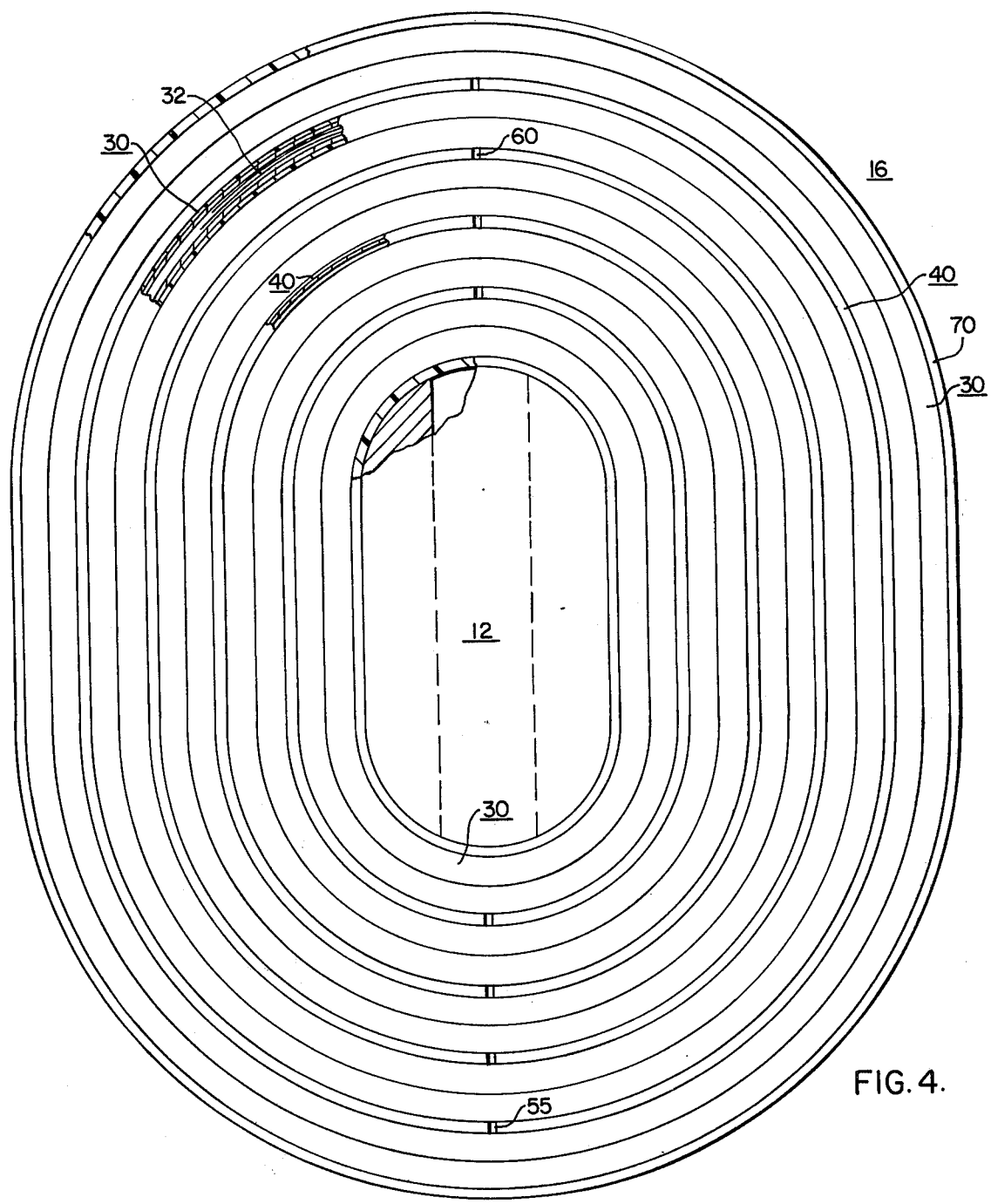
FIG. 4 is a plan view, partly in section, of the rotor of FIG. 1.

Flow passages are provided through each coil of the winding by means of a spacing element 40 which is convolutely disposed between selected conductor layers as can be seen in detail in FIGS. 2 and 4 of the drawing. The spacing element 40 comprises rib portions 42 which engage and space apart confronting surfaces of conductor turns of next adjacent layers and non-contacting portions 44 which in combination with the confronting surfaces of the conductors define a plurality of channels 50 to permit passage of a cooling fluid such as liquid helium through the coil. Since the temperature difference between the maximum conductor temperature and any part of the winding and the temperature of the coolant must be minimized, the spacing element 40 is preferably constructed from a material having a high coefficient of thermal conductivity such as copper; however, materials other than copper may be used to good advantage In an efficient superconductive winding the internal space required by the cooling system must be minimized to provide a high ratio of superconductor per unit winding. Accordingly the lateral width of the spacing element 40 should be very small in relation to the lateral thickness of the superconductive wires 30, and need not be more than 20 mils for most applications. In its preferred form, therefore, the spacing element 40 appears as a relatively thin copper foil in which the channels 50 have been extruded throughout its length.

The number of conductor layers or rows between the spacing elements may be adjusted to meet design criteria. For example, in a winding in which fast charging rates are desired and in which serve transients may occur it may be desirable to include at least one of the spacing elements 40 in convolute relation with each pair of next adjacent winding layers. On the other hand, if charging and discharging of the winding and an increase in tolerance to transients is not a sensitive problem, it may be desirable to form a winding structure in which at least one of the spacing elements 40 is disposed in convolute relation with selected ones of the next adjacent winding layers, there being at least two or more winding layers disposed intermediate of each pair of spacing elements. In the latter arrangement, of course, a higher ratio of superconductor per unit winding may be obtained.

As may be seen from the drawing, the preferred embodiment shown herein utilizes superconductive wires 30 having a rectangular cross section. The rib portions 32 and non-contacting portions 44 of the spacing element 40 also are generally rectangular in cross section and at least one channel 50 is defined by the non-contacting portions 44 and the confronting surface of each next adjacent conductor 30. Since leakage between the channels must be minimized, the rib portions 44 are preferably interposed intermediate of next adjacent non-contacting portions 44 to provide discrete passages for the cooling fluid.

The conductors 30 of the superconducting winding must withstand large rotational and magnetic forces without any mechanical movement or vibration. The convolute arrangement of the spacing elements 40 as described herein is mechanically stable because the spacing element 40 is held securely between the overlapping conductor turns. However, it may be desirable to bond the spacing element 40 to the next adjacent winding layers by means of a bonding material to form a more rigid structure. The bonding material may be a pressure sensitive material that will bond itself when sufficient pressure is applied. In this particular embodiment, however, a bonding material that may be used to good advantage is an epoxy resin that is thermosetting when heated to a predetermined temperature. However, a bonding material other than an epoxy resin may be used to good advantage. The bonding material selected should be a relatively viscous substance so that it will not flow into the channel area and interfere with the flow of the coolant.

Figure 3:
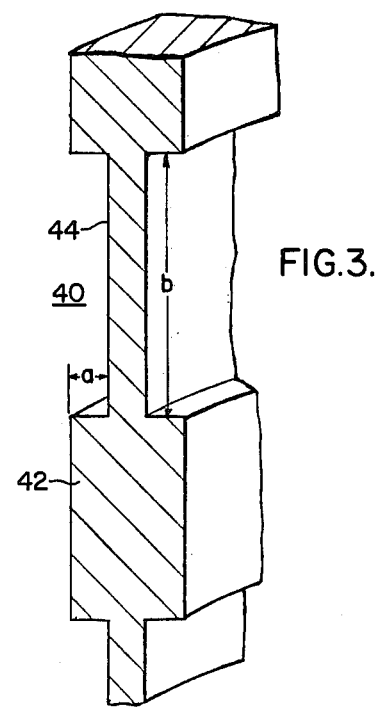
FIG. 3 is an enlarged isometric view, in section, of a portion of a spacing element of the winding of FIG. 2.

In FIG. 3 an enlarged view of a portion of the spacing elements 40 is illustrated. The dimensions $a$ and $b$ which correspond with the size and pitch of the channels may be determined from the cooling requirements of the winding. Generally the ratio $a:b$ determines the rate of heat transfer of the cooling fluid for a given flow rate. Since these dimensions are relatively small the coolant mass for a given flow rate inside the winding at any time is minimized and therefore provides a safer cryogenic assembly. Likewise an optimal coolant flow rate may be established by proper choice of the dimension $a$ and $b$. It is obvious that such a cooling arrangement is reliable and may be operated without need for internal maintenance.

In general, for such a winding in which the superconductive wires 30 have a rectangular cross section, the dimension $b$ or the transverse extent of each channel is preferably much greater in relation to the dimension $a$ or its lateral extent so that the confronting surface area of the conductor which in combination defines the channel will be large in relation to the surface area contacted by the rib portions of the spacing separator 40. In this construction, good heat transfer can be obtained with a minimum quantity of cooling fluid. Such a preferred arrngement is shown in FIG. 2 in which a spacing element 40 is disposed between every second conductor layer. In this configuration there is formed one channel 50 for each next adjacent conductor, and although there are two conductor layers distributed between the separating elements 40, each conductor of each layer will be intimately exposed to coolant fluid by means of one channel on a confronting outer surface. This construction guarantees that each conductor will have at least one of its outer surfaces exposed to cooling fluid for efficient heat transfer purposes.

The distribution of the spacing elements 40 is shown in more detail in FIG. 4 of the drawing. In FIG. 4 the core member 12 is shown having a principle axis of symmetry about which the winding layers and spacing elements are symmetrically disposed. The spacing elements 40 of each layer are shown to be bifurcated along the axis of symmetry to provide substantially equal flow paths through the coil on either side of the axis of symmetry. The bifurcation of the spacing elements along the axis of symmetry forms regions of discontinuity between the end portions of the spacing elements 40. These regions of discontinuity serve as inlet ports 55 to receive the cooling fluid and outlet ports 60 to discharge the cooling fluid after it has passed through the coil.

Figure 5:
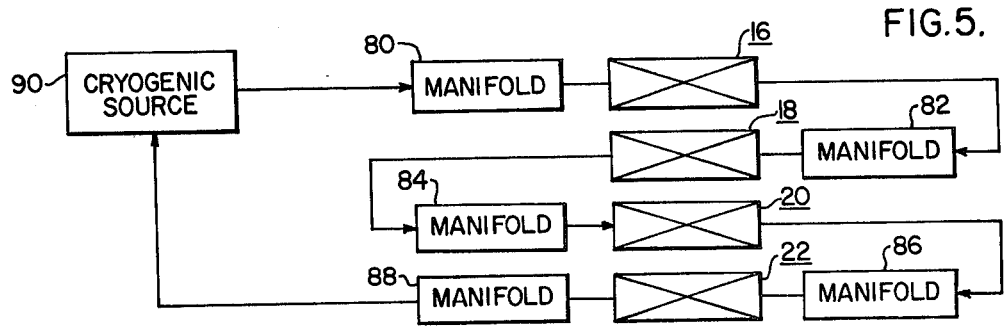
FIG. 5 is a schematic flow diagram for the rotor structure of FIG. 1.

Referring now to FIG. 5, cooling of the coils 16–22 to superconductive temperatures is provided by suitable refrigeration means 90 from which the coolant is pumped through the discrete cooling channels or ducts 50 which are disposed within the winding. The cooling channels direct the flow of the cooling fluid from the cryogenic source 90 through one end turn area through the active length of the winding to the opposite end turn area where it exits from the outlet ports 60 to be collected.

Where the winding comprises a plurality of coils as shown in FIG. 5 it may be desirable to include an input manifold such as the manifold 80 for each winding layer to be associated with the inlet ports 55 of the channels 50 of each separating element to provide fluid communication between the inlet port of the channels and the cryogenic source 90. The outlet ports 60 of the channels of each coil are similarly coupled by suitable manifold means to collect the cooling fluid as it is discharged from each coil. The outlet ports 60 of the coil 16 are coupled by suitable manifold means 82 to the inlet ports of the cooling channels of the winding 18, the output ports and inlet ports of the remaining coils being similarly coupled together by the manifolds 84, 86, and 88 thereby permitting the flow of the cooling fluid through each of the coils successively in a serial flow arrangement as illustrated in FIG. 5 of the drawing.

It should be apparent that a cryogenically stable winding structure has been provided that has a large proportion of superconductor per unit of winding. Passages are established through the winding structure to permit a large flow of cryogenic fluid with high cooling efficiency while occupying a minimal amount of space and without impairing the structural stability of the winding. It should be understood that various modifications, changes and variations may be made in the arrangements, operations and details of construction of the elements disclosed herein without departing from the spirit and scope of the present invention.

I claim as my invention:
1. In combination,
    a rotor member of a dynamoelectric machine, said rotor member including a core having slots in which a number of conductor turns are convolutely wound to form a plurality of coils, said coils being electrically connected one to another to constitute a rotor winding, each of said coils having a plurality of conductor layers; and,
    a spacing element disposed between adjacent conductor layers in each coil and extending therethrough in a convolute relation therewith, said spacing element comprising:
    rib portions which engage and space apart confronting surfaces of conductor turns of adjacent conductor layers; and,
    non-contacting rib portions disposed intermediate said contacting rib portions which in combination with said contacting rib portions and the confronting surfaces of said conductors define a plurality of channels to permit passage of a cooling fluid through said coils, said channels being separated one from another by said non-contacting rib portions, each said channel providing a continuous, discrete flow path through said channel and having an inlet port to receive the cooling fluid and an outlet port to discharge the cooling fluid after it has passed through said coil.
2. A winding structure as defined in claim 1 in which at least one of said spacing elements is disposed in convolute relation with each pair of next adjacent winding layers.
3. A winding structure as defined in claim 1 in which at least one of said spacing elements is disposed in convolute relation with selected ones of next adjacent winding layers, there being at least a plurality of winding layers disposed intermediate of each pair of spacing elements.
4. A winding structure as defined in claim 1 including an input manifold associated with each coil, said manifold providing fluid communication between the inlet ports of said channel and a source of cooling fluid.
5. A winding structure as defined in claim 4 wherein there are N of said coils, N being a positive integer greater than 1, including means coupling the output ports of the channels of the $n$th coil in fluid communication with the input manifold associated with the $(n+1)$ st coil, $n$ being a positive integer less than N, thereby permitting the flow of cooling fluid through each of said coils successively in a serial flow arrangement.
6. A winding structure as defined in claim 1 in which each of said coils has a principal axis of symmetry about which said winding layers and spacing elements are symmetrically disposed, each of said spacing elements being bifurcated along said axis thereby establishing a substantially equal flow path through said coil on either side of said axis of symmetry, there being regions of discontinuity between the end portions of said bifurcated spacing elements along said axis of symmetry.
7. A winding structure as defined in claim 1 in which said convoluted conductor layers extend laterally with respect to said core said spacing elements being generally circumferentially coextensive with said winding layers, the lateral cross-sectional area of said spacing elements being small as compared with the lateral cross-sectional area of the next adjacent conductor layer.
8. A winding structure as defined in claim 7 in which said conductors are generally rectangular in cross section and the rib portions and channels of said spacing elements are also generally rectangular in cross section, there being at least one such channel defined by said non-contacting rib portions of said spacing element and the confronting surface of each next adjacent conductor.
9. The winding structure of claim 8 in which said contacting rib portions are formed intermediate of next adjacent channels to provide at least one discrete cooling channel for each next adjacent conductor.
10. The winding structure of claim 8, each channel having a lateral extent, in cross section, which is small in relation to its transverse extent, the confronting surface area of said conductor which in combination defines said channel being large in relation to the surface area of said conductor contacted by said contacting rib portions.
11. The winding structure of claim 1 in which said contacting rib portions are secured to said winding layers by means of a bonding material.
12. The winding structure defined in claim 1 wherein said conductors are stabilized superconductive wires, each of said wires comprising:
    a plurality of filaments of superconductive material formed into a strand;
    a sheath of normally conductive material encasing said strand; and
    a layer of non-conductive materials surrounding said normally conductive material.
* * * * *